United States Patent [19]

Crozat et al.

[11] Patent Number: 4,724,754
[45] Date of Patent: Feb. 16, 1988

[54] APPARATUS FOR MAKING MOLDED CONFECTIONS

[76] Inventors: Bertrand Crozat, Oberfürberger Str., 14; Herbert Mederer, Sperberstr. 24a, both of 8510 Fürth, Fed. Rep. of Germany

[21] Appl. No.: 894,252

[22] Filed: Aug. 7, 1986

[30] Foreign Application Priority Data

Aug. 8, 1985 [DE] Fed. Rep. of Germany ....... 3528426

[51] Int. Cl.⁴ .............................................. A47J 27/00
[52] U.S. Cl. ........................................ 99/348; 99/483; 165/145; 366/144; 366/149; 366/337
[58] Field of Search .................. 99/348, 483; 366/144, 366/147, 148, 149, 337; 165/159, 165, 145

[56] References Cited

U.S. PATENT DOCUMENTS

| | | | |
|---|---|---|---|
| 2,052,856 | 9/1936 | Truelsen | 165/159 |
| 2,391,244 | 12/1945 | Jackson | 165/159 |
| 3,045,981 | 7/1962 | Hendrickson | 165/159 |
| 3,348,610 | 10/1967 | Vollhardt | 165/159 |
| 4,127,389 | 11/1978 | Hackemesser | 165/159 |

Primary Examiner—Robert W. Jenkins
Attorney, Agent, or Firm—Browdy & Neimark

[57] ABSTRACT

Apparatus for tempering or boiling of compositions for making molded confections, e.g., hard sugar compositions, soft sugar compositions and gelatine moulding compositions, etc., in a continuously operating production plant, involving a short length of stay of the composition, while at the same time effecting an optimum dissolution of the constituents thereof. A container, located between a composition supply duct and a composition removal duct, has several guide metal sheets spaced over the height of the container, with at least one flow opening for the compositions to be processed. At least one flow element is arranged in the axial direction of the container. The flow elements open out at their upper end and lower end into a chamber. A hot medium is passed through the flow elements, which heats the composition or the moulding composition.

14 Claims, 2 Drawing Figures

APPARATUS FOR MAKING MOLDED CONFECTIONS

FIELD OF THE INVENTION

The present invention relates to an apparatus for conditioning, mixing, dissolving and/or tempering or boiling of confection compositions, e.g. hard sugar compositions, soft sugar compositions and gelatine moulding compositions, etc., and for use in a continuously-operating production plant for the manufacture of compositions ready for moulding of, e.g., gelatine, starch, agar-agar, pectin and gum arabic base, as well as for combinations of these gelling substances.

BACKGROUND OF THE INVENTION

For the production of gum and jelly compositions based on gelatine, starch, gum arabic, etc., conventional boiling apparatus is known. Prior art apparatus includes manually charged combined boilers as well as automatically charged, yet intermittent, boiling equipment. Furthermore, vacuum boiling apparatus is known for continuous composition production. Generally, these machines have a boiling hose through which the composition to be heated is passed and which is heated from outside by means of a heat-releasing medium. Furthermore, a device for the production of gum or jelly compositions is known from the "Neues Handbuch der Susswaren-Industrie", Vol. I, page 144, in which the composition is heated in a hose with turbulence baffles to the required solution temperature. In the production of molded confection compositions, a basic composition, which consists, e.g., of glucose, sugar, gelatine, water, etc., is first of all mixed. This basic composition must them be processed further, i.e., it is necessary to carry out a mixing and dissolving or suspending of the dry and liquid constituents until they are completely dissolved. This is effected by melting down or tempering and boiling. In this connection it is important that the composition, while being constantly stirred, should be slowly heated so that the particles contained in it, i.e., e.g., sugar and possibly starch, dissolve. In addition, however, the gelatine or the gelatine portion contained in the composition must be treated absolutely gently, i.e., the composition must stay in the heater for as short a time as possible, and not be subjected to thermal shocks during heating, for the reason, among others, that these compositions can catch fire very quickly. Furthermore, an arrangement for heating compositions must be constructed in such a manner that by means of it, with compact size and low utilisation of power as compared with the standard arrangements, it is possible to achieve a high daily rate of production of compositions.

SUMMARY OF THE INVENTION

It is an object of the present invention to improve known heating arrangements, in terms of efficiency, while simplifying the construction thereof, in such a manner that the time the composition remains in the heater is short, the constituents of the composition are dissolved in optimum manner and the composition is treated in an extremely gentle manner.

The object of the present invention is achieved by providing a container. This container comprises a container outer wall which may be vertically disposed, with a cover part and a bottom part, between a composition supply duct and a composition removal duct. Several guide metal sheets are disposed spaced over the height of the container, with at least one flow opening for the composition to be treated. One or a plurality of flow elements, are disposed, preferably parallel one with the other, in the axial direction of the outer wall of the container. The flow elements open out at their upper or lower end into an upper and lower chamber in such a manner that from the upper chamber a hot medium is passed into the lower chamber through the flow element(s), and in that the composition to be heated is led over the guide metal sheets from the cold to the hot area of the container.

In the apparatus of the present invention, openings in the guide metal sheets on one side are formed as segment-shaped sections, and these sections of guide plates following one another are disposed with an offset of some 180° relative to one another.

As a result of this construction a compulsory deviation of the composition in the container is effected by the pipes provided in the container and arranged in the longitudinal direction of said container. Additional turbulence is achieved through the pipes disposed in close proximity to each other, apart from the intensive heat exchange.

According to a preferred embodiment of the invention, provision is made in the guide metal sheets for an opening, which may be circular or of any geometric shape, or a cut-out of any form. The geometrical shape of these cut-outs permits additional turbulence of the constituents contained in the composition.

According to a further embodiment of the invention, guide metal sheets and baffles are disposed alternately one behind the other, and in such a way that the openings or cut-outs in the guide plates, and the baffles situated opposite said openings or cut-outs in the cold area of the container have a greater surface, and that these surfaces decrease in size towards the hot area of the container. As a result, the composition becoming constantly thinner in the hot area of the container as a result of heating is accelerated and, in spite of the lower viscosity, is optimally whirled around or mixed.

Additionally, according to another feature of the invention, the distances between the baffles and the guide metal sheets may be reduced in size as they approach the hot area of the container.

For the further enhancement or utilization of the heat transmission onto the pipes disposed in the container, the guide metal sheets and the baffles disposed opposite in each case are arranged with openings or diameters of alternately different sizes.

In a preferred embodiment of the invention, the guide metal sheets or baffles are corrugated in shape. By this means, as the composition to be processed passes along, an additional turbulence or a better mixing of the particles contained in the composition is achieved.

In another embodiment of the invention, the guide metal sheets or baffles are perforated. These perforations may exhibit a greater cross-section in the cold area of the container than the perforation of the corresponding sheets in the hot area.

The container or arrangement according to the invention may be disposed horizontally or slantwise. In yet a further embodiment the outer wall of the container may be a double one, and it may have a supply connection and a delivery connection for a heat-supplying medium. By this means the area for an effective transmission of heat between the medium in the container is increased, and the length of stay of the composition in the container is reduced as a result of the quicker heating of the composition. This advantageous construction can be achieved in that the container outer wall has an integrated pipe system.

Generally, it is preferred if the container is heat-insulated externally.

In order to increase still further the degree of efficiency of the arrangement according to the invention and in order to achieve further savings of energy, and to achieve lower solution or boiling temperatures, according to another embodiment of the invention a valve is fitted in the outlet duct for the tempered composition to regulate the container internal pressure. With this valve it is possible to adjust in optimum manner both the pressure inside the container and the flow rate or length of stay of the composition in the container.

DESCRIPTION OF THE DRAWINGS

Further details, advantages and characteristics of the invention will be explained in greater detail on the basis of the examples of embodiment according to the drawings wherein.

DETAILED DESCRIPTION OF THE DRAWINGS

Figure 1:
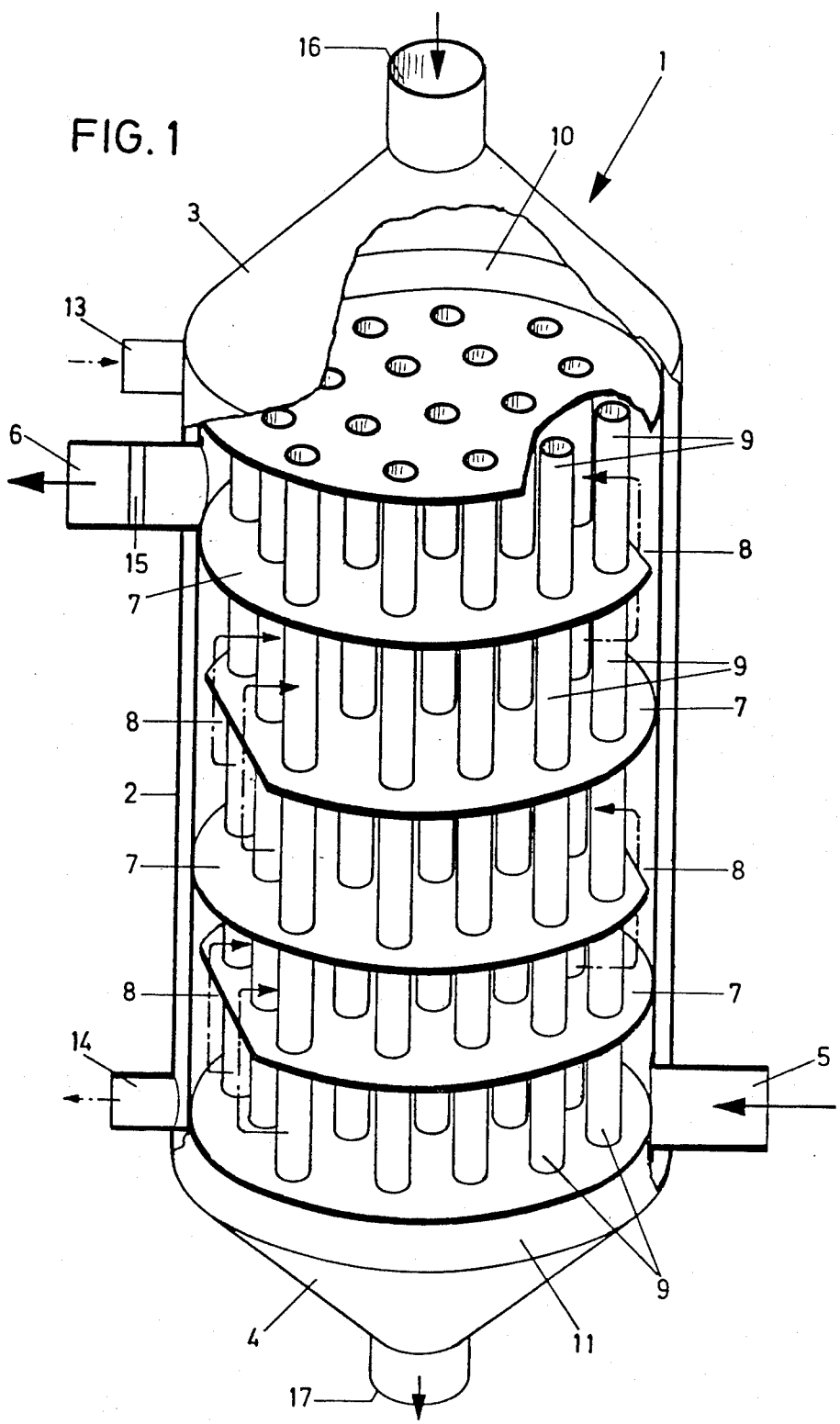
FIG. 1 shows diagrammatically a perspective of an apparatus according to the invention.

FIG. 1 is a representation of an apparatus according to the invention, particularly for mixing, dissolving and tempering or boiling of gelatine pouring compositions for continuously operating a production plant. This apparatus comprises a container 1 which has a vertically-disposed cylinder-shaped container outer wall 2 and is closed off at the top and bottom by a conical or flat cover part 3 or bottom part 4. On the cover part 3 an inlet connection piece 16 is disposed, through which a heat-conveying medium is passed into the upper container space 10. Similarly, in the bottom part 4, an outlet connection piece 17 is fitted. The upper container space 10 is connected with the lower container space 11 by means of flow elements 9, e.g. rows of pipes arranged in parallel which may also be offset one relative to the other. Along these flow elements or pipes 9 the heat conveying medium is passed from the top to the bottom container space. Inside the container, at vertical distances which may become smaller as they go up, metal sheets, 7 7' with segment-shaped cut-outs are disposed, in such a manner that the segment-shaped cut-outs face one another alternately. Arranged on the outer wall 2 of the container is a composition supply duct 5 through which the medium to be heated or the pouring composition to be heated is pumped at excess pressure by a pump mounted in the supply duct 5 into the inside space of the container. Through the pipes 9 arranged in latticed fashion, along which the heat-conveying medium flows or is passed, there takes place, on the one hand, a transfer of heat to the composition wetting the wall of the tubes, and as a result of the deviation of flow or by-passing, an optimum mixing or turbulences of the constituents contained in the composition. The guide metal sheets 7 have segment-shaped flow openings 8. These openings 8 are provided for the passage of the composition in the respective space beyond. As these openings 8 have a smaller cross-section than the composition supply duct 5 there occurs in every case a pressure rise before the flow opening, ad a pressure drop behind it. As a result of the alternated arrangement of the flow opening, or the superimposed arrangement of the guide metal sheets the composition is constantly heated increasingly towards the upper part of the container, as the heat-supplying medium flows from above into the container or heats the flow elements or pipes 9 from the top downwards. This has the advantage that the composition to be treated on its way from the bottom art of the container to the upper part of the container is gently warmed or heated. By means of a valve 15 arranged in the composition removal duct 6 it is possible to regulate the flow of composition in the container or the internal pressure of the container and the rate of flow of the composition through the container. As shown in FIG. 1, the outer wall 2 of the container is hollow and is fitted with a supply connection 13 and a removal connection 14 through which the heat-supplying medium can be additionally passed. Thereby an even better degree of efficiency is obtained with respect to the heating of the composition flowing through.

Figure 2:
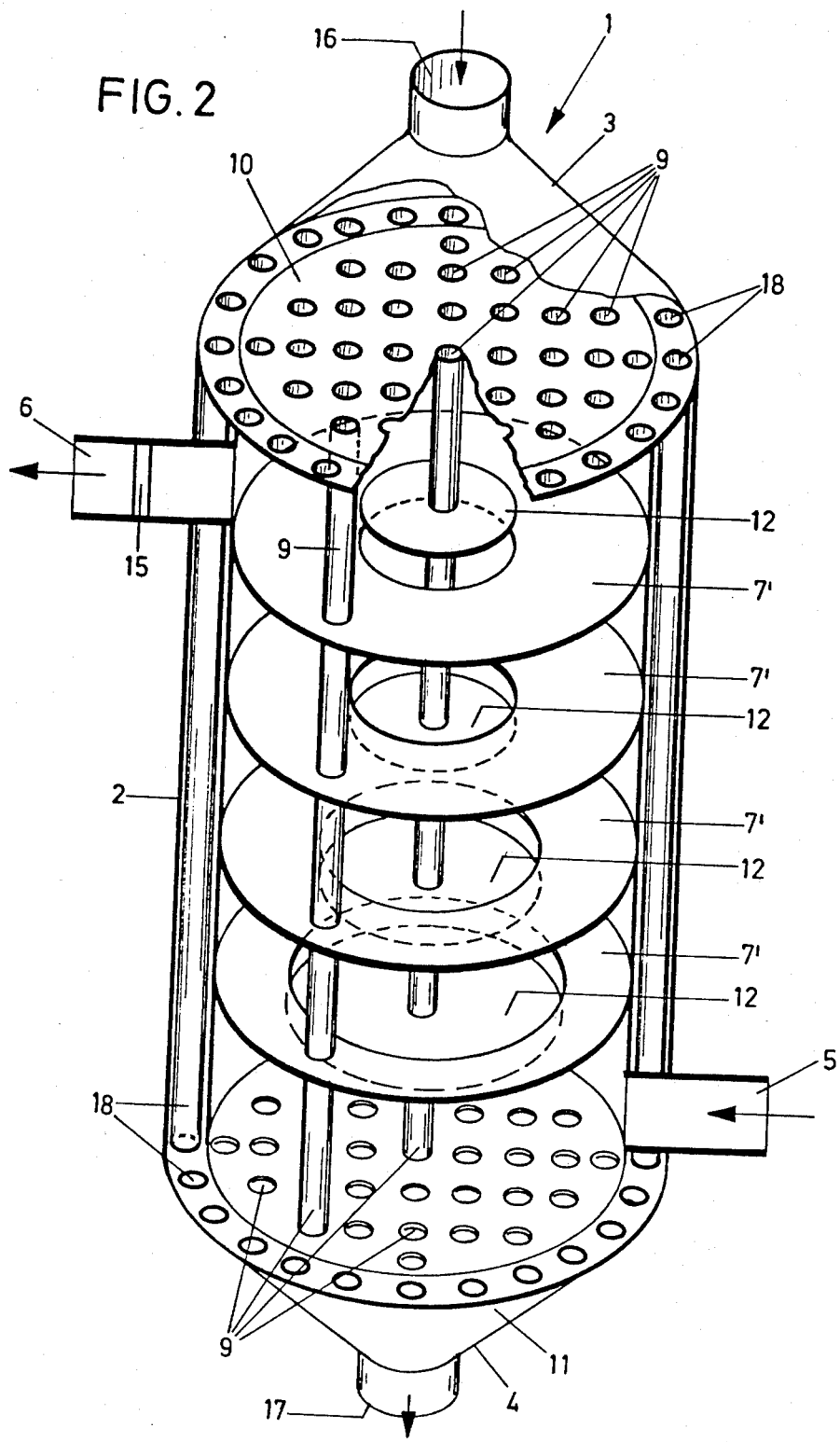
FIG. 2 is a further example of embodiment of an apparatus according to the invention in diagrammatic perspective representation.

Another embodiment of the apparatus according to the invention is shown in FIG. 2. In the inner space of the container, guide metal sheets 7' and baffles 12 are provided alternately. The guide sheets 7' have circular cut-outs which are placed opposite to correspondingly dimensioned baffles. The diameters of these circular cut-outs, as well as the analogous diameters of the baffles 12 narrow down towards the cold area of the container 1, or upwardly. Similarly, there is a narrowing down of the vertical distances between guide metal sheets 7 towards the hot area of the container. The composition introduced with excess pressure in the relatively cold area of the container first flows around the pipes 9 arranged in lattice fashion, of which only two are shown in FIG. 2, through which the heat-conveying medium is passed from above downwards, i.e. against the flow of composition, so that a gentle or slow heating of the composition is ensured. The composition flowing through the container is constantly deflected and correspondingly swirled by means of the baffles or guide sheets, so that a thorough mixing or dissolution of the constituents contained in the composition is achieved. To regulate the flow of composition or the internal pressure of the container a control valve 15 as described in FIG. 1 is mounted in the composition removal duct 6. In the embodiment according to FIG. 2 an integrated system of pipes 18 is further represented, these pipes are arranged in the outer wall 2 of the container, or constitute it. The arrangement described hereinabove for mixing, heating and dissolving of compositions can be operated both in the direct flow and in the counterflow process. It is characterised by a simple construction and a good degree of efficiency and is particularly suitable for the treatment of moulding gelatine compositions.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. Apparatus for conditioning compositions for making molded confections in a continuously operating production plant comprising a container having a container outer wall vertically disposed with a cover part and a bottom part and said container having an upper chamber in said cover part and a lower chamber in said bottom part;

a composition supply duct and a composition removal duct, both connected through said container outer wall to supply to said container and remove from said container, respectively, a composition for making molded confections;

ducting disposed in said container for carrying a heat conveying medium;

said ducting disposed parallel to the axial direction of said container outer wall and opening into said upper chamber at its upper end and opening into said lower chamber at its lower end to pass the heat conveying medium from said upper chamber to said lower chamber through said ducting;

a plurality of guide metal sheets axially disposed in said container, each having a flow opening to allow passage of said composition from a cold area of said container to a hot area of said container;

a plurality of baffles axially disposed in said container in an alternate arrangement with said guide metal sheets;

said flow opening in said guide metal sheet and said baffle adjacent said flow opening having a greater opening area in said guide metal sheet and a greater surface area of said baffle in said cold area of said container with said opening are of said guide metal sheet and said surface area of said baffle decreasing for said guide metal sheets and said baffles closer to said hot area of said container wherein said composition for making molded confections to be heated and boiled is passed over said guide metal sheets and said baffles from said composition supply duct to said composition removal duct.

2. The apparatus of claim 1 wherein
said flow openings in said guide metal sheets are formed as segment-shaped sections on a side of said guide metal sheets, each succeeding flow opening offset approximately 180 degrees relative from the previous flow opening.

3. The apparatus of claim 1 wherein
said flow openings in said guide metal sheets have an opening within said guide metal sheet having a geometric shape.

4. The apparatus of claim 1 wherein
the distance between said guide metal sheets and said baffles decreases toward said hot area of said container.

5. The apparatus of claim 1 wherein
said flow opening in said guide metal sheet and said baffle adjacent thereto having diameters of different size from alternately spaced flow openings and baffles.

6. The apparatus of claim 1 wherein
said guide metal sheets are perforated.

7. The apparatus of claim 1 wherein
said baffles are perforated.

8. The apparatus of claim 1 wherein
said container is disposed horizontally.

9. The apparatus of claim 1 wherein
said container is disposed at an angle.

10. The apparatus of claim 1 wherein
said container outer wall is constructed as a double wall having a supply connection and a removal connection for heat conveying medium.

11. The apparatus of claim 1 wherein
said container outer wall has an integrated system of pipes within said container outer wall.

12. The apparatus of claim 1 wherein
said container outer wall is formed by an integrated system of pipes.

13. The apparatus of claim 1 wherein
said container is heat-insulated.

14. The apparatus of claim 1 wherein
said composition removal duct has a valve for controlling the internal pressure of said container.

* * * * *